THIN FILM SIGNAL TRANSLATING DEVICE

Filed May 31, 1963 2 Sheets-Sheet 1

INVENTOR
SOLOMON R. POLLACK

BY David Teschne [signature]

ATTORNEY

United States Patent Office 3,258,608

Patented June 28, 1966

3,258,608
THIN FILM SIGNAL TRANSLATING DEVICE

Solomon Pollack, Philadelphia, Pa., assignor to Sperry Rand Corporation, New York, N.Y., a corporation of Delaware Filed May 31, 1963, Ser. No. 284,608
31 Claims. (Cl. 307—88.5)

This invention relates to thin film structures and more particularly to a multi-input thin film signal translating device employing the tunnel effect phenomenon.

In order to meet the increasing demand for smaller less expensive, more reliable and more flexible computing devices, current interest has been directed to thin film type devices. These thin film devices are small in size and may be constructed in a plurality of layers of insulating and conducting metals formed by a variety of processes including thermo-decomposition, electroplating and evaporation. The devices can be fabricated to produce a plurality of logical functions depending upon the manner of placement of the various conducting metals and insulators. Additional functions may be provided by increasing the numbers of individual ones of the elements thereby providing for multi-input or output connections.

As stated above, these devices work according to the tunnel effect phenomenon which may generally be explained as follows. Electrons are made to pass from a first thin film metal conductor through an insulator to a further thin film metal conductor under the influence of an externally applied electric field. The electrons leaving the first metal film are not given sufficient energy to exceed the forbidden energy band of the insulator and thus enter the conduction band of the insulator to provide a current. Instead the forbidden energy band of the insulator is partially disturbed to permit the electrons leaving the first metal film to tunnel through the now decreased region of the forbidden band and thus enter the conduction region of the insulator. Inclusion of a further metal makes possible the collection of the electrons emitted by the first metal and passed through the insulator to produce a detectable output. The passage of electrons through the biased and modified forbidden energy band of the insulator will depend upon the metals selected, the values of potential applied and the qualities of the insulating material.

In its most usual form, a thin film, polycrystalline, active electronic device known as a tunnel triode comprises three separate metallic films which may be identified according to transistor notation as the emitter, the base and the collector. These three electrically conducting metallic films are separated from each other by two thin insulating films known as the emitter base insulator and the base collector insulator. In operation, the tunnel triode is biased with the emitter negative relative to the base and the base negative relative to the collector. Again, in transistor notation this would be equivalent to an NPN type transistor. The electronic conduction processes of a tunnel triode with proper potentials applied can be further described as follows. Electrons at the Fermi level in the emitter tunnel through the forbidden energy gap in the emitter base insulator into either the conduction band of this insulator or directly into the base itself. These electrons then traverse the base film and enter into the base collector insulator. Under the influence of the electric field in this insulator, electrons continue until they can be detected by a conventional means such as an evaporated thin film collector. The tunnel effect phenomenon is largely defined as a quantum mechanical tunneling effect, and is extremely fast in operation, being in the order of 10–12 to 10–14 of a second. The device is relatively temperature and radiation insensitive and it is particularly adapted to micro-miniaturization and to mass production techniques.

In constructing a solid state, thin film tunnel triode the film of metal corresponding to the emitter is usually in the order of 1000 angstroms in thickness and may lie anywhere within the range of 5,000 to 10,000 angstroms. The base metal film generally has a thickness of about 100 angstroms or less and may fall within the range of 75 to 300 angstroms. The collector film, like the emitter, usually has a thickness upwards of 1,000 angstroms and may lie in the range of 5,000 to 10,000 angstroms. The emitter base insulator, of the insulating film separating the emitter and base, is usually very thin preferably in a range of 10 to 30 angstroms. The insulator film separating the base and the collector has a thickness upwards of 100 angstroms and may fall in the range of 100 to 300 angstroms. Reference is made to the United States Patent 3,056,073 issued September 25, 1962, to Carver A. Mead for a description of solid state electron devices such as a thin film tunnel diode and thin film tunnel triodes of which the subject invention is an improvement thereof. The disclosures of this patent are incorporated and made a part of this disclosure. In accordance with the above-cited Mead patent, there is disclosed methods by which single thin film triode devices may be constructed. These devices, as with other vacuum and gas type triode devices, may be organized to perform complete logical circuits by means of external connections. Such connections require the use of additional capacitors, resistors and other coupling elements as well as connective elements and mounting facilities. Much of the space which is saved by the use of a thin film type of triode device is thus lost in the requirements for external connection. It is, therefore, desirable to construct a single logical circuit employing thin film techniques which can overcome these shortcomings by placing sufficient elements into a single package to produce a desired logical function without recourse to external elements. It is, therefore, an object of this invention to provide a complete logical signal translating device with all connections being made within the unit itself at the time of formation.

It is an object of this invention to provide an improved logical gating device.

It is an object of this invention to provide a logical NOR circuit where all connections are made at the time of the formation of the thin film logical device itself.

It is an object of this invention to provide a thin film NOR circuit employing the techniques of a thin film triode but which includes a plurality of base elements capable of independently accepting a plurality of input signals and whose output is indicative of the logical NOR function.

Yet another object of this invention is to provide a logical NOR circuit which can be constructed cheaply and rapidly by means of thin film techniques.

Other objects and features of the invention will be pointed out in the following description and claims, and illustrated in the accompanying drawings which disclose, by way of example, the principle of the invention and the best mode which has been contemplated for carrying it out.

In a preferred embodiment, the invention consists of a basic unit constructed of a plurality of thin films (insulated from one another) in which one or more of those films may act as a control for the operation of the remaining films. As described briefly above, the first of such films is known as the emitter and serves as a source of electrons for the device. Next there will be provided a plurality of further films known as the base films which are made receptive to external signals to control the operation of the device as a whole. The final film employed to complete the unit is known as the collector and serves to receive the electrons transmitted through the base films from the emitter. Further, as has been described above, there are placed a series of insulating members between the emitter and plurality of bases and a further insulating member between the plurality of bases and the single collector. A first bias is applied across the emitter and collector films to provide an alerting potential which is just insufficient to permit a large degree of tunneling from the emitter to the collector layer. It should be understood that some degree of tunneling would take place in the presence of any type of potential; however, with a small value of bias applied a very small amount of tunneling will take place. It is not until a critical bias point of the device is reached that a large increase in electron flow is achieved for small increases in the applied bias. The bias supplied by a bias means is kept well below the point required to permit a large electron flow. The individual bases of the device are then each made responsive to a different one at a plurality of signal sources each of which can supply additional potential to cause the device to be driven into a range where a large electron flow can take place. Thus if there is an input to any one of the bases of the device, the device will produce an output. Due to the inherent 180° electrical phase shift, a positive input signal applied to the device will result in a negative output. Thus for no input signal a positive output will be provided. However, for any one or all of the inputs applied to the various bases of the device a negative output will be achieved. This satisfies the requirements of the logical NOR circuit in that the device will produce an output if no input is present and produce no output, if any input is present. If the positive signal is considered the output and the negative signal considered no output, the NOR function can readily be seen to be satisfied. Looked at in another way, the device is an AND gate for the absence of signals (negative signals) and an OR gate for any signal present (positive signals).

This device will be more completely described and the novel features thereof understood when considered with respect to the appended claims. The invention itself both as to its organization and method of operation will best be understood from the following description when read in connection with the accompanying drawings wherein:

FIGURE 1*a* is an energy level diagram representing the conditions for thermoequilibrium at a junction between a metal and an insulator.

FIGURE 1*b* in a typical manner, depicts the tunneling current available as a result of applied electric potentials.

FIGURE 2 is an energy level diagram of a three film device constructed in accordance with this invention and which has applied to it an external biasing potential.

FIGURE 3, composed of FIGURES 3*a*, 3*b*, 3*c*, 3*d*, 3*e*, 3*f*, 3*g* and 3*h*, illustrates component portions of the logical NOR circuit constructed in accordance with this invention.

FIGURE 4, comprising FIGURES 4*a*, 4*b*, 4*c* and 4*d*, illustrates in various steps the manner of placement of the individual portions shown in FIGURE 3 in the construction of the logical NOR circuit in accordance with this invention.

Similar elements are given similar reference characters in each of the respective drawings.

Figures 1A, 1B, 2:
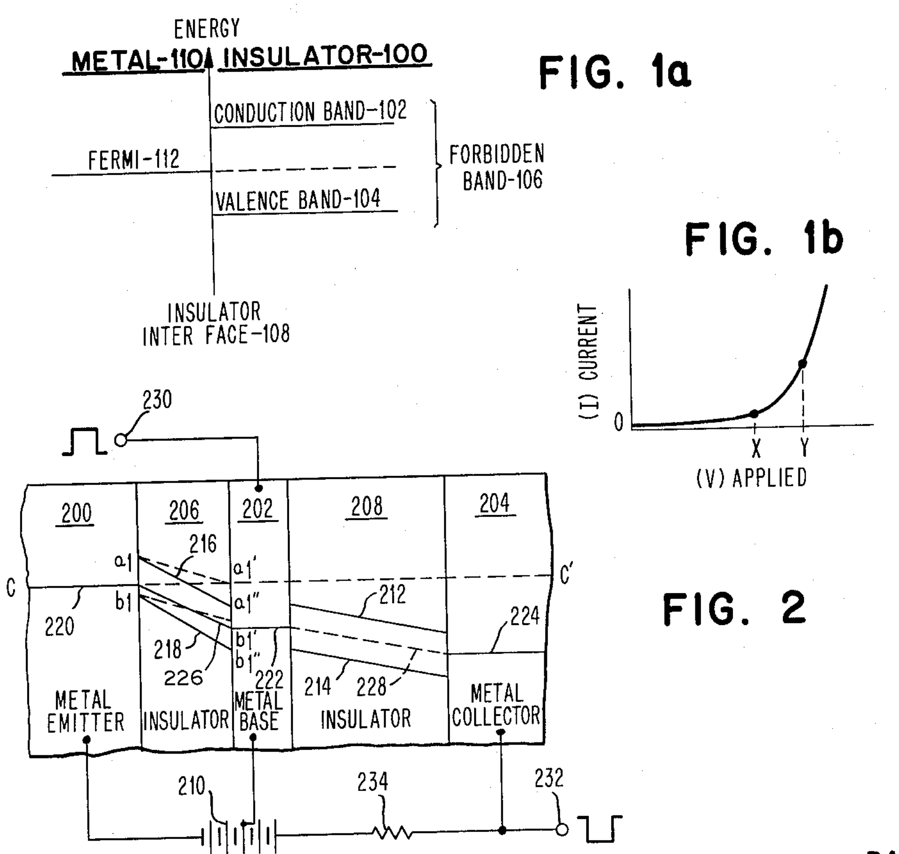

Referring now to FIGURE 1*a*, there is shown an energy diagram of a metal placed in contact with an insulator. The insulator 100 is shown to have two distinct energy levels as indicated by the conduction band level 102 and the valence band level 104. The level above the conduction band level 102 is the region in which electrons may freely be passed through the insulator, the insulator acting as a normal conductor would. Between the conduction band level 102 and the valence band level 104 is an area designated the forbidden energy band 106. The forbidden energy band simply designates that area of electronic energy which no electron found within the insulator would normally display. Below the valence band level 104, all of the electronic energy states are normally occupied. The electronic energy states may be defined as allowed energy levels of electrons in a solid within an energy band. To the left of the metal insulator interface 108 is found the metal 110. The metal is shown as having a particular Fermi level 112 below which electronic states are occupied by electrons and above which electronic states are vacant. The Fermi level may be defined as the level of electron energy below which all electronic energy states are filled. It should be noted that the insulator 100 also has a Fermi level and due to contact of the two materials, the metal and the insulator, the Fermi level will be the same in both materials.

Referring now to FIGURE 2, there is shown a triode constructed in accordance with the concepts of the invention which include a metal emitter 200, a metal base 202, a metal collector 204 and an emitter base insulator 206 and finally a base collector insulator 208. The emitter 200 is connected to the negative terminal of the battery 210 while the positive terminal of the battery 210 is connected to the metal collector 204. At some intermediate point along the battery 210, the base 202 is also connected. In this manner, the films of the triode of FIGURE 2 will be biased so as to make the emitter negative with respect to the base and the collector positive with respect to the base. A comparison of the forbidden energy band within the insulator 208 as compared to the forbidden band 106 of FIGURE 1*a* indicates the effect of a bias voltage applied to a thin film. The forbidden energy band of FIGURE 1*a* is shown perpendicular to the interface between the metal and the insulator. This would be the normal condition which would exist when the metal and insulator were placed in contact without application on an external field. However, the application of an external field, as in the case of FIGURE 2, to the two metals on either side of the insulator 208 places a field across the insulator 208. This causes the conduction band level 212, the valence band level 214, and the Fermi level 228 to take on the position at an acute angle to the interface between the base metal film 202 and the insulator film 208. The angle which these lines will make with the interface will be dependent upon the voltage placed across the base and collector electrodes, that is, the field impressed across the insulator 208. The greater the field the smaller will be the angle when measured from the interface. An illustration of this may be seen in considering the movement of the conduction band level 216 and the valence band level 218 of the insulator 206 with the potential placed across the insulator 206. The line $a_1$–$a_1'$ illustrates the conduction band level 216 position for a lower potential than the position occupied by the line $a_1$–$a_1''$.

In a similar manner the valence band level 218 is illustrated under a low potential condition when occupying the position along the line $b_1$–$b_1'$ whereas it occupies the position $b_1$–$b_1''$ under the influence of a greater potential.

However, it should be understood some tunneling will take place at practically any value of potential applied. Thus if we assume the solid state unit employing three films, the first and third of which are metal films similar to the emitter 200 and the base 202 of FIGURE 2 the central one being the insulating film such as that of 206 of FIGURE 2 and a small bias is placed across the insulator by means of applying a voltage between the metal emitter and the metal base, a very small amount of tunneling current could be found if detection and indicating means were attached to the unit. This small amount of current would be due to a limited amount of tunneling taking place from the emitter metal through the insulator to the base metal. As the strength of the field impressed across the insulator is increased, the amount of tunnel current due to the increased presence of tunneling electrons would be increased.

Reference is now made ot FIGURE 1*b* which is a plot of the tunnel current against the voltage supplied to such a unit as described above. It can be seen that for a small increase of applied potential there will be a small value of increase in the current made available by the tunneling electrons. Thus in the area from the origin O of FIGURE 1*b* to the point designated X, small increases in voltage will result in small increases in the tunneling current. In the area between points X and Y, small increases in the applied voltage will result in larger increases in the tunneling current until finally beyond the point Y small increases in the applied voltage will result in an extremely large flow of current within the tunnel unit described.

Turning again to FIGURE 2 the following additional facts relating to the Fermi levels of the various metals may be found. It should be understood from the figure that a direction to the top of FIGURE 2 indicates in electron energy (due to an increasing negative bias) whereas a movement towards the lower portion of the diagram indicates a decrease in electron energy level (due to the application of a positive bias). The Fermi level 222 of the metal base 202 biased to a positive value is thus at a lower electron energy level than the metal emitter Fermi level 220. Finally, the Fermi level 224 of the metal collector 204 being biased even more positively than the metal base 202 is thus found at still a lower Fermi level and a lower electron energy level. The Fermi levels for the intermediate insulators 206 and 208 are in such a manner as to connect the Fermi levels of their respective end films, that is, the Fermi level 226 of the insulator 206 takes on a position in equilibrium with the Fermi level 220 of metal emitter 200 and position in equilibrium with the Fermi level 222 of the metal base 202. In a similar manner, the Fermi level 228 of the insulator 208 takes a position in equilibrium with the Fermi level 222 of the base 202 and a position in equilibrium with the Fermi level 224 of the metal collector 204. Thus the lines connecting these equilibrium positions is inclined as shown. The width of the forbidden band, as defined by the conduction band level 212 and the valence band level 214 for the insulator 208, and for the insulator 206, by the conduction band level 216 and the valence band level 218 will be constant for the respective insulating materials regardless of the bias applied.

In operating the device of FIGURE 2, a primary bias source, such as battery 210, is employed. A negative bias value is placed on the metal emitter 200, a slight positive value of bias is place on the base 202 and a more positive value of bias placed on a collector 204. The conduction band level 216 will take on a position as indicated by the line $a_1$–$a_1'$ whereas the valence band lever 218 will take on the position indicated by the line $b_1$–$b_1'$. Considering an electron existing at the Fermi level of the metal emitter 200 and attempting to pass along line 220 extended along a line to the right through the insulator 206, the metal base 202, etc., the electron would have to traverse a path through the entire forbidden band of the insulator 206. The amount of tunneling which results due to the bias potential would be small in magnitude. The detection circuitry could be arranged so that levels below a particular value would not be permitted to indicate the flow of this current. This is to say that a certain minimum value of current would be necessary before the device would be permitted to indicate that an input had been received. If we now assume that an input in the form of a positive pulse is applied to the input terminal 230 of the metal base 202, the conditions for the flow of a large tunneling current are achieved. The additional positive level will cause the metal base 202 to be biased to a lower value of electron energy than existed as a result of the application of the bias from the battery 210. As a result of the increased field across the insulator film 206 and due to the influence of the input signal, the forbidden energy band of the insulator 206 takes on the positions indicated by the lines $a_1$–$a_1''$ and $b_1$–$b_1''$. Again considering an electron beginning at the Fermi level 200 of the metal emitter 200 and passing along a straight path to the right through the insulator 206 and the metal base 202, etc., it can readily be seen that only a portion of this path extends through the forbidden energy band whereas a portion passes through the conduction hand of the insulator 206. The total path through the insulation 206 now is one of far less resistance in that only a portion of the path goes through the forbidden band and a portion goes through the conduction band. It should be re-called that for a lower bias condition the entire traversal of an electron at this level would have been through the forbidden energy band encountering much greater resistance to its traversal of the insulator film.

The electron which starts this travel from the position C on the Fermi level 220 of the metal emitter 200 would normally continue along the same line to the position C1 if it encountered no further resistance within the metals or failed to contact other electrons on its traversal. However, the effects of passing through the insulating members and the metal base will be a loss of some energy. The traversal by an electron through the insulator 208 will take place in such a manner as to cause the electron to pass over the forbidden energy band of the insulator 208. The bias placed across the metal base 202 and the metal collector 204 will have to be sufficient so that electrons which are slowed down in a movement through the insulator 206 may be urged through the insulator 208 to the collector 204 to produce a useful output. The output for the device in FIGURE 2 is taken from a terminal 232 at one side of a resistor 234 which is connected at its other side to the positive terminal of the battery 210. The resistor is also connected at terminal 232 to the metal collector 204.

Figures 3A, 3B, 3C, 3D, 3E, 3F, 3G, 3H:
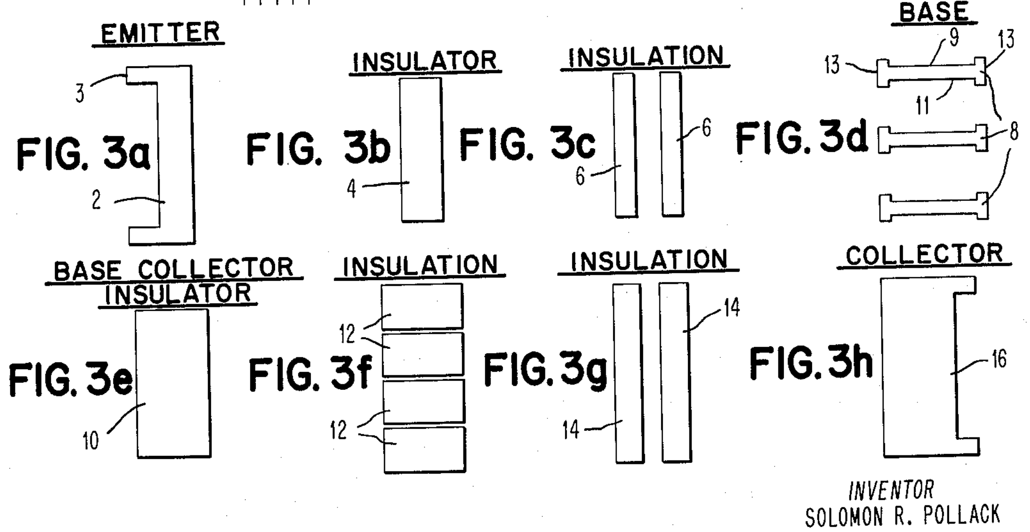

Turning now to FIGURE 3, there can be seen the various component portions of the multi-input NOR circuit constructed in accordance wth the concepts of the invention. The first portion of the device designated 2 is a metal emitter in the shape of a C facing with the open portion to the left. The dimensions of the emitter device, from top to bottom, may be controlled in order to place as many base electrode films as desired upon the device. The width of emitter films is chosen so as to provide a sufficiently large contact area with respect to the metal base elements which are placed upon it but not so large as to provide unwanted input capacities. The emitter metal film may comprise aluminum, tantalum, tungsten or zirconium and may be deposited upon a glass substrate (not shown) by vacuum evaporation, chemical decomposition or any other suitable means. The following film placed upon the emitter film is a tunnel insulating or emitter base insulating film similar to the films 206 of FIGURE 2. This film may be, in the case of an aluminum emitter, either an air grown aluminum oxide or an anodized aluminum oxide layer. In the event that tungsten, zirconium or tantalum metal is used for the emitter, the aluminum oxide coating will be an evaporated aluminum oxide coat if one is desired. However, the oxides of the tantalum, tungsten or zirconium may be used by the process of anodization of the emitter metal. This emitter base insulator will be in the range of 10 to 350 angstrom units in thickness, preferably in the range of 30 to 50 angstroms. It is desired that this insulating film have a thickness which is equal to or smaller than the mean free path of an electron in that material. The material used in the insulator may be deposited in a thicker range equal to or in excess of the mean free path of an electron in the particular insulating material, but means must be employed to cause the apparent distance which an electron travels to be reduced to a distance equal to or less than the mean free path of an electron. The procedure such as growing inclusions or traps within the insulating material or of forming the material is disclosed in the copending application No. 203,131 for Thin Film Structures by S. R. Pollack et al., filed June 18, 1962, and assigned to the assignee of the present invention. The forming process disclosed in the aforementioned application serves to convert a relatively thick insulating material into an apparently thinner material and requires the employment of an electric potential across the insulating material for a given period of time. By a procedure of forming it has been observed that an aluminum oxide film of 350 angstroms in thickness can be made to respond and act as a film in the range of 30 to 50 angstroms. Thus in accordance with the criteria established above, the apparent thickness of the material as far as the electron traversing the insulator is concerned will be in the range of a thickness equal to or less than the mean free path of the electron in that material. However, the actual thickness will be greater than the mean free path.

Figure 5:
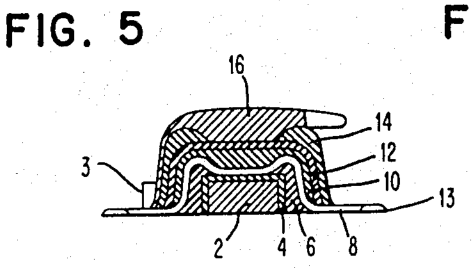
FIGURE 5 illustrates a sectional view taken along the line 5—5 of FIGURE 4*d* and which illustrates the layer build-up of the thin film device constructed in accordance with the concepts of this invention.

The next films placed upon the structure are the films indicated as 6 in FIGURE 3 and constitute silicon monoxide insulating materials. The emitter as will be described with reference to FIGURE 5 is relatively rectangular in cross section with sharp corners. Thus the oxide film insulator placed upon it will have its smallest thicknesses at the edges of the emitter film. Due to the small thicknesses of the insulator at this point, greater fields and voltages are present at these points and may contribute quickly to the breakdown of films at these points thus causing short circuiting or rupture of the device. The edge films are placed in a manner to be described below to insulate the edges of the emitter from the base metal films. The next films to be deposited upon the element is the base metal which consists of a series of I-shaped bars of equal size placed along the length of the emitter from top to bottom. Each one of these bars constitutes a single input connector to the circuit to be disclosed. Tabs at the end are made for connection to external sources. Base metals may be made from materials such as gold or silver. In selection of these metals, it is preferable that the vacuum work function of the metal employed for the base material is higher than the vacuum work function of the metal employed for the emitter. The base films are indicated as 8 in the FIGURE 3. The thickness of the metal base films should be in the range of equal to or smaller than the mean free path of the electrons in that particular material.

The next material which will be employed is a base collector insulator 10 which is similar in size and shape to the emitter base insulator 4. This film is similar to that film described with reference to FIGURE 2 as the insulator 208 and serves to insulate the base from the collector film. This film has a thickness which is determined by the ability of that film to withstand the potentials impressed on the triode as a whole in order to get sufficient tunneling currents without breaking down. In other words, it is necessary that this film be able to stand sufficient voltages for the device to produce useful tunneling currents. The thickness will, of course, vary according to the particular material employed as the insulator. The insulator may be an evaporated aluminum oxide film.

The next deposited films are a series of further edge insulating films of evaporated silicon monoxide and designated 12. These are placed in such a manner as to insulate the edges 9 and 11 of the base metal 8 from the collector to be placed upon the stack. The next layer deposited is a further edge insulating device of silicon monoxide labeled 14. These edge insulators 14 are similar in form and operation to the edge insulating devices 6 as described above and are employed to insulate the edges 13 of the base metal from the edges of the emitter and the collector films.

The final element to be placed upon the stack will be the collector film 16. This film may be evaporated aluminum or gold and is similar in shape and form to the metal emitter 2 described above. Its thickness will also be in the range described above, in excess of 1,000 angstroms and preferably in the range from 5,000 to 10,000 angstroms.

Turning now to FIGURE 4 composed of FIGURES *4a, 4b, 4c* and *4d,* the manner of building up and placement of the various individual component units as described with reference to FIGURE 3 can be seen. The emitter film 2 is first deposited on a glass substrate (not shown). The emitter base insulator 4 is then deposited upon the emitter film so as to place the film 4 centrally located with reference to the central body 1 of the emitter 2. The tabs 3 of the emitter film 2 are left completely exposed for external connection. Next, as shown in FIGURE *4b,* the edge films 6 are deposited so as to centered about the edges of the central body 1 of the emitter film 2. In this manner, they can completely protect the base films deposited overtop of the emitter from possible short circuit at the sharp edges of the emitter film. The base films 8 are layed atop and transverse to the emitter film 2. The films 8 are shown arranged along the length of the central body 1 of the film 2 at regular intervals and the size of the base films are of uniform cross section and length. As was stated above, the length of the central body member 1 of the emitter 2 may be made as long as desired in order to accept as many base films as are desired to be placed thereon. It should be understood at this point that although three base members are shown so that the device may operate with three inputs, it is not considered to be limited to this number and more or fewer of such base films may be included in the device commensurate with the use desired. As was stated above, the relative sizes of the films 8 used as the base and the film 2 used as the emitter are chosen so that the contact area is sufficient for proper tunneling to take place but small enough to minimize the capacitance effects which will be present between two large plate elements separated by an insulating material. A large capacitance between the film 2 and the film 8 would affect the input characteristics of the device and produce a large input capacity. Construction to this point has been illustrated with reference to FIGURES *4a* and *4b*. In an effort to keep the manner of placement of the respective films clear, the next portion of the development of the device will be illustrated in FIGURE *4c* with the repetition of some of the films already shown in FIGURES *4a* and *4b*. This should not be interpreted as meaning that additional films of the type already described are placed upon the stack already developed, but rather this is in an effort to show the proper and logical development and buildup of the device and the proper relative placement of the respective films as they are added. Thus the film 2 used as the emitter and the films 8 employed as the base elements are again shown in FIGURE *4c*. Atop the base films 8 are placed a base collector insulating film 10 in such a manner that it is centrally located with respect to the central body 1 of the film 2 and occupies a position congruent with the insulating film 4 which is previously deposited as the base emitter insulator. Atop the insulator 10 are placed a series of edge insulators 12 which are used to insulate the edges 9 and 11 of the base films 8 as well as the edges of the emitter 2. The first of the films 12 is placed so as to overlap the upper edge of the central body member 1 as well as the right hand edge of the central body member 1 of the film 2. The film extends so as to cover the edge 9 of the first base metal film 8. The second edge insulating film 12 extends from the edge 11 of the first base film 8 over the edges of the central body 1 of the film 2 to cover the edge 9 of the second base film 8. The third film 12 extends in a manner similar to the second one, that is, from the bottom edge 11 of the second base film 8 over the edges of the central body member 1 of the emitter 2 over the top edge 9 of the third base film 8. The fourth insulating member 12 extends from the bottom edge, that is, the edge 11 of the third base metal film 8, over the botom portion and the right edge of the body member 1 of the emitter film 2.

Figure 4A:
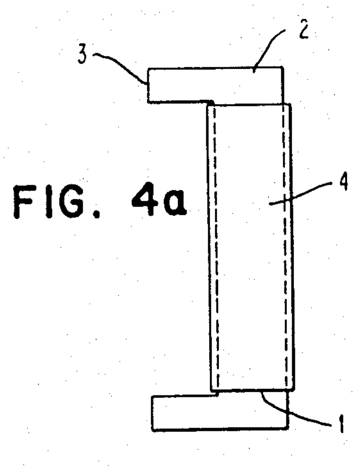
Figure 4B:
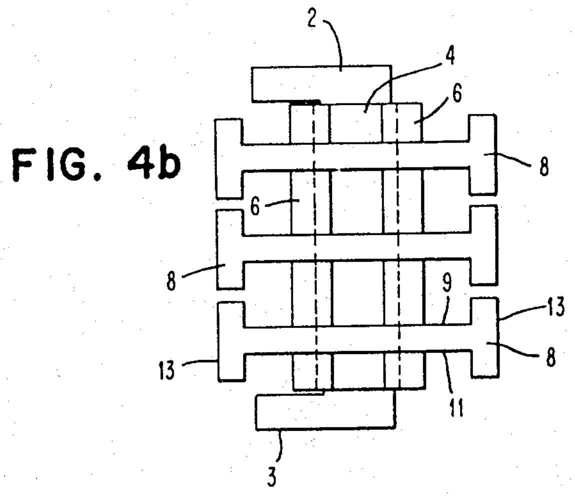
Figure 4C:
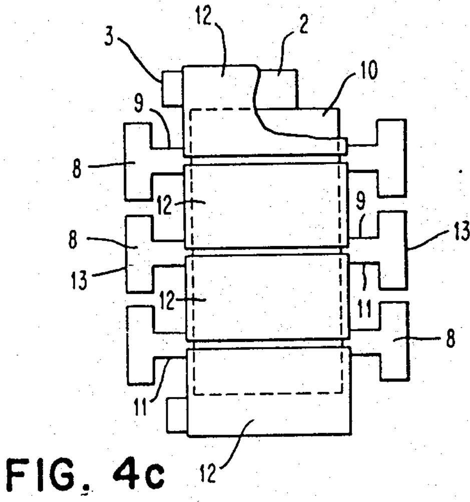
Figure 4D:
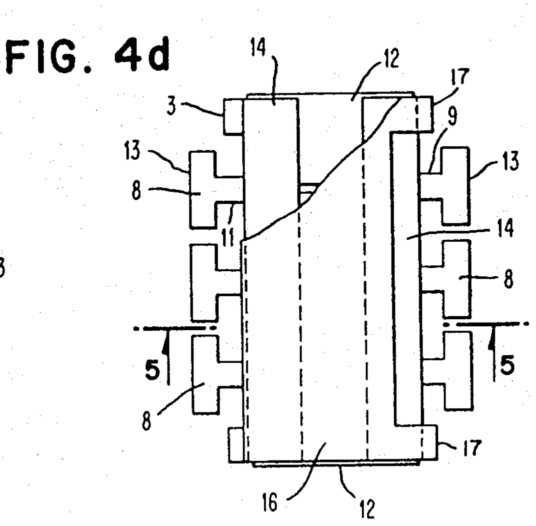

The further buildup of the insulating final collector films are shown in FIGURE 4*d*. As with respect to FIGURES 4*a*, 4*b* and 4*c*, portions of the buildup thus far described are repeated in FIGURE 4*d* for the purpose of clarity. Therefore, the films 2, 8 and 12 as described with reference to FIGURES 4*a*, 4*b* and 4*c* are again displayed. Atop the rightmost and the leftmost edges of the films 12 and in such a manner as to cover the left and right edges of the central body 1 of the emitter film 2, are placed a series of further edge insulators 14. These extend for the whole length of the emitter member and extend in length to the limits of the films 12. Atop the stack thus far developed and centrally located with respect to the left insulator member 14 is placed the collector film 16 in a C shape similar to that of the emitter. However, the collector is placed in such a manner that its tabs 17 face to the right instead of to the left as the tabs 3 of the emitter film 2. The lower portion of FIGURE 4*d* shows a top view of the stack as completed wherein most of the surface of the conductor film 16 may be observed with its tabs 17 facing to the right. The tabs 3 of the emitter film 2 facing to the left may be seen extending below the collector film 16. Finally, the portions of the base film 8 with the tabs to the left and right may be seen protruding from the width of the film 16. The emitter connections may be made by means of the tabs 3 to the emitter film 2. Collector connections may be made to the tabs 17 of the collector film 16 and finally inputs may be supplied to the tabs 13 of the base films 8.

The device as shown in FIGURE 4 provides an idealized view of the manner of construction of the device. Due to the problems of depositing the films, the films are not as square and clear cut as is indicated in FIGURE 4. A section along the line 5—5 as shown in FIGURE 4*d* more accurately depicts the actual appearance of the films and is shown in FIGURE 5. Referring now to FIGURE 5, the films as disclosed and described with reference to FIGURES 3 and 4 are shown as they are built up. Starting with a glass substrate (not shown) a relatively square and well defined emitter film 2 is deposited. Upon this due to processes of air oxidation or anodization a relatively square and conforming base emitter insulator 4 is formed. To protect the edges of this oxide, silicon monoxide edge insulating films 6 are deposited. These films as shown do not extend across the entire width of the central body 1 of the film 2 but terminate close to the respective edges of film 2. Atop the film 6 is placed a thin film 8 which extends from beyond the emitter element 2 on the left to beyond the emitter element 2 on the right. This provides the connecting tabs as shown more clearly in FIGURE 4. Atop the entire mass, is placed a film 10 of relatively constant cross sectional area with relatively uniform height with respect to the glass substrate. Atop this is placed the insulator 12 which is used as the edge insulator between respective edges of the base film. In a manner similar to that described with reference to film 6, edge insulating elements 14 are placed so as to protect the edges of the emitter 2 from the collector to be deposited. Finally the collector film 16 is deposited over top of the entire group with a tab provided to the right as shown.

Figure 6:
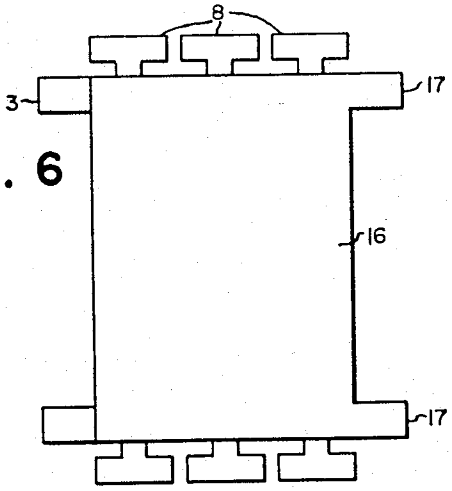
FIGURE 6 illustrates an alternative arrangement of the base elements of the device constructed in accordance with the concept of this invention.

FIGURE 6 shows an alternative arrangement wherein the base films are layed in a direction parallel with the emitter and collector films. In order to accommodate the base films, the central body of the films 2 which constitute the emitter and 16 which constitute the collector are made wider to accommodate these base films in the parallel direction. It should be understood that the films disclosed with regard to insulating and tunneling will be also employed and be placed upon the respective edges in a manner analogous to that described with reference to FIGURE 4. It should be obvious to one skilled in the art, from a reading of this specification, how the construction of the device illustrated in FIG. 6 can be made.

As was described above, the device of this invention operates as a tunnel effect logical NOR circuit. The positive input to any one of the base films 8 causes a tunnel current to be developed in the collector 16. If a single one of these films is operated by a positive input, the device will produce a negative output signal at a suitable output connection to the collector 16. In a similar fashion, for each other base film operated, a similar value of current will be produced. In order that the output not indicate the number of inputs which are available to the device, a discriminating type of output device such as a saturable magnetic amplifier may be employed. Thus, providing the proper initial input level is reached, that is an input equivalent to the value of one tunneling unit, the device will produce an output of a given value regardless of the number of additional tunneling elements made to operate.

With no input applied to the device at any one of its base films, the device will produce a positive output signal which is determined by the value of the positive bias voltage 210. However, upon the application of an input to any one of the base films, a negative output signal will be produced as the result of the tunnel current which the input effects. Thus if the positive output is considered to be a signal and a negative output is considered to be no signal, the device will produce, according to the NOR logic, an ouput if no inputs are present, or produce no output if any one or any combination or all of its inputs are present.

It will be understood that various omissions and substitutions and changes of the form and detail of the device illustrated and in its operation may be made by those skilled in the art, without departing from the spirit of the invention.

The embodiments of the invention in which an exclusive property or privilege is claimed are defined as follows:

1. A signal translating device comprising a first thin conducting film member; a plurality of second thin conducting film members mounted transverse to and atop said first thin film member; a third thin conducting film member mounted parallel to said first thin film member and atop said second thin film members; first means to insulate the contact areas of said first and second and said second and third film members respectively; second means connected to said first and third thin film members to apply a bias to said thin film members to establish first energy levels in said first, second and third thin film members; a plurality of third means, each connected to a separate one of said second film members to change the electron energy level of said second film members and permit the transfer of electrons from said first to said third film members; and fourth means coupled to said third thin conducting film member to produce an output indicative of said transfer of electrons.

2. A signal translating device comprising a first thin conducting film member; a plurality of second thin conducting film members mounted transverse to and atop said first thin film member; first insulating means, for insulating the contact areas of said first film member from the contact areas of second film members; a third thin conducting film member mounted parallel to said first thin film member and atop said second thin film members; second insulating means for insulating the contact areas of said second film members from their respective contact areas on said third film member; first potential means connected to said first and third thin film members to apply a bias to said thin film members to establish first energy levels in said first, second and third thin film members; a plurality of second potential means, each connected to a separate one of said second film members to change the electron energy level of said second thin film members and permit the tunneling of electrons from said first to said third members in appreciable amounts; and means coupled to said third thin film member to produce an output indicative of said tunneling of electrons.

3. A signal translating device according to claim 2, wherein said first insulating means is a thin film whose thickness is equal to or smaller than the mean free path of an electron therein.

4. A signal translating device according to claim 2, wherein said first insulating means is a thin film whose thickness is equal to or greater than the mean free path of an electron therein.

5. A signal translating device according to claim 3, wherein said second thin film members have thicknesses equal to or smaller than the mean free path of an electron therein.

6. A signal translating device according to claim 4, wherein said second thin film members have thicknesses equal to or smaller than the mean free path of an electron therein.

7. A signal translating device according to claim 5, wherein said second insulating means have thicknesses sufficient to prevent insulation breakdown at the potentials employed for tunneling within said translating device.

8. A signal translating device according to claim 6, wherein said second insulating means have thicknesses sufficient to prevent insulation breakdown at the potentials employed for tunneling within said translating device.

9. A signal translating device according to claim 7, wherein said first and third thin conducting film members are metals which adhere to the following relationship: that the metal of the first thin film member has a lower vacuum work function than the metal of the third thin film member.

10. A signal translating device according to claim 8, wherein said first and third thin conducting film members are metals which adhere to the following relationship: that the metal of the first thin film member has a lower vacuum work function than the metal of the third thin film member.

11. A signal translating device according to claim 9, wherein the metal of said first thin film member is aluminum and said first insulating means is the oxide of aluminum.

12. A signal translating device according to claim 10, wherein the metal of said first thin film member is aluminum and said first insulating means is the oxide of aluminum.

13. A signal translating device according to claim 9, wherein the metal of said first thin film member is selected from a group comprising tantalum, tungsten and zirconium and said first insulating means comprises the anodized oxide of the metal employed as said first thin film member.

14. A signal translating device according to claim 10, wherein the metal of said first thin film member is selected from a group comprising tantalum, tungsten and zirconium and said first insulating means comprises the anodized oxide of the metal employed as said first thin film member.

15. A signal translating device according to claim 13, wherein the metal of said second and said third thin film members is selected from the group comprising gold and silver and said second insulating means is evaporated aluminum oxide.

16. A signal translating device comprising a first thin conducting film member; a plurality of second thin conducting film members mounted parallel with and atop said first thin film member; a third thin conducting film member mounted parallel with and atop said second film members; first means to insulate the contact areas of said first and second and said second and third film members respectively; means connected to said first and third thin film members to apply a bias to said thin film members to establish first energy levels in said first, second and third thin film members; a plurality of third means, each connected to a separate one of said second film members to change the electron energy level of said second film members and permit the transfer of electrons from said first to said third film members; and fourth means coupled to said third thin film member to produce an output indicative of said transfer of electrons.

17. A signal translating device comprising a first thin conducting film member; a plurailty of second thin conducting film members mounted atop said first thin film member; a third thin conducting film member mounted atop said second thin film members; first means to insulate the contact areas of said first and second and said second and third film members respectively; second means connected to said first and third thin film members to apply a bias to said thin film members to establish first energy levels in said first, second and third thin films members; a plurality of third means, each connected to a separate one of said second film members to change the electron energy level of said second film members and permit the transfer of electrons from said first to said third film members; and fourth means coupled to said third thin film member to produce an output indicative of said transfer of electrons.

18. A signal translating device comprising a first thin conducting film member; a plurality of second thin conducting film members mounted atop said first thin film member; first insulating means, for insulating the contact areas of said first film member from the contact areas of said second film members; a third thin conducting film member mounted atop said second thin film members; second insulating means for insulating the contact areas of said second film members from their respective contact areas on said third film member; first potential means connected to said first and third film members to apply a bias to said thin film members to establish first energy levels in said first, second and third thin film members; a plurality of second potential means, each connected to a separate one of said second film members to change the electron energy level of said second thin film members and permit the tunneling of electrons from said first to said third thin film members in appreciable amounts; and means coupled to said third thin film member to produce an output indicative of said tunneling of electrons.

19. A signal translating device according to claim 18, wherein said first insulating means is a thin film whose thickness is equal to or smaller than the mean free path of an electron therein.

20. A signal translating device according to claim 18, wherein said first insulating means is a thin film whose thickness is equal to or greater than the mean free path of an electron therein.

21. A signal translating device according to claim 19, wherein said second thin film members have thicknesses equal to or smaller than the mean free path of an electron therein.

22. A signal translating device according to claim 20, wherein said second thin film members have thicknesses equal to or smaller than the mean free path of an electron therein.

23. A signal translating device according to claim 21, wherein said second insulating means have thicknesses sufficient to prevent insulator breakdown at the potentials employed for tunneling within said translating device.

24. A signal translating device according to claim 22, wherein said second insulating means have thicknesses sufficient to prevent insulator breakdown at the potentials employed for tunneling within said translating device.

25. A signal translating device according to claim 23, wherein said first and third thin conducting film members are metals which adhere to the following relationship: that the metal of the first thin film member has a lower vacuum work function than the metal of the third thin film member.

26. A signal translating device according to claim 24, wherein said first and third thin conducting film members are metals and adhere to the following relationship: that the metal of the first thin film member has a lower vacuum work function than the metal of the third thin film member.

27. A signal translating device according to claim 25, wherein the metal of said first thin film member is aluminum and said first insulating means is the oxide of aluminum.

28. A signal translating device according to claim 26, wherein the metal of said first thin film member is aluminum and said first insulating means is the oxide of aluminum.

29. A signal translating device according to claim 25, wherein the metal of said first thin film member is selected from a group comprising tantalum, tungsten and zirconium and said first insulating means comprises the anodized oxide of the metal employed as said first thin film member.

30. A signal translating device according to claim 26, wherein the metal of said first thin film member is selected from a group comprising tantalum, tungsten and zirconium and said first insulating means comprises the anodized oxide of the metal employed as said first thin film member.

31. A signal translating device according to claim 29, wherein the metal of said second and third thin film members is selected from the group comprising gold and silver and said second insulating means is evaporated aluminum oxide.

References Cited by the Examiner

UNITED STATES PATENTS

| | | | |
|---|---|---|---|
| 2,428,400 | 10/1947 | Geel | 317—235 |
| 3,178,594 | 4/1965 | Pollack | 307—88.5 |

JOHN W. HUCKERT, *Primary Examiner.*

L. ZALMAN, *Assistant Examiner.*